United States Patent
Tammela

(10) Patent No.: US 7,218,823 B2
(45) Date of Patent: May 15, 2007

(54) METHOD AND DEVICE FOR SPECTRAL FILTERING

(75) Inventor: Simo Tammela, Espoo (FI)

(73) Assignee: Liekki Oy, Lohja AS (FI)

( * ) Notice: Subject to any disclaimer, the term of this patent is extended or adjusted under 35 U.S.C. 154(b) by 253 days.

(21) Appl. No.: 10/526,667

(22) PCT Filed: Sep. 4, 2003

(86) PCT No.: PCT/FI03/00646

§ 371 (c)(1),
(2), (4) Date: Mar. 4, 2005

(87) PCT Pub. No.: WO2004/023182

PCT Pub. Date: Mar. 18, 2004

(65) Prior Publication Data

US 2005/0254761 A1    Nov. 17, 2005

(30) Foreign Application Priority Data

Sep. 4, 2002  (FI) ................................ 20021580

(51) Int. Cl.
*G02B 6/16* (2006.01)
(52) U.S. Cl. ................................ 385/123; 385/126
(58) Field of Classification Search ........... 385/123, 385/126
See application file for complete search history.

(56) References Cited

U.S. PATENT DOCUMENTS

| | | | | |
|---|---|---|---|---|
| 3,976,356 A | * | 8/1976 | Jenkins | 385/126 |
| 4,038,062 A | * | 7/1977 | Presby | 65/382 |
| 4,372,645 A | | 2/1983 | Miller | |
| 4,949,038 A | * | 8/1990 | Birch et al. | 385/12 |
| 5,615,295 A | * | 3/1997 | Yoshida et al. | 385/123 |
| 6,118,575 A | | 9/2000 | Grubb et al. | |
| 2006/0024008 A1 | * | 2/2006 | Galvanauskas | 385/123 |
| 2006/0204194 A1 | * | 9/2006 | Kragl | 385/123 |

FOREIGN PATENT DOCUMENTS

| | | |
|---|---|---|
| EP | 0 538 879 A1 | 4/1993 |
| EP | 0703475 A1 | 3/1996 |
| WO | WO 00/43816 | 7/2000 |

* cited by examiner

*Primary Examiner*—Frank G. Font
*Assistant Examiner*—James P. Hughes
(74) *Attorney, Agent, or Firm*—Venable LLP; Eric J. Franklin

(57) ABSTRACT

A method and a device in optical fiber based spectral filtering. A length of an optical fiber including at least a core region surrounded by a cladding region is coiled over its length in whole or in part to subject the fiber to longitudinal curvature in order to affect the optical transmission properties of the fiber. The fiber is arranged to have radially asymmetric refractive index distribution and in addition to coiling the fiber lengthwise, the fiber is over its length in whole or in part also twisted around its longitudinal axis. The method and device can be used to significantly improve the performance of fiber based filtering devices.

13 Claims, 5 Drawing Sheets

METHOD AND DEVICE FOR SPECTRAL FILTERING

FIELD OF THE INVENTION

The present invention relates to a method in optical fiber based spectral filtering. The invention further relates to a spectral filter device implementing the method.

BACKGROUND OF THE INVENTION

Telecommunications based on optical fibers is a rapidly evolving technical field. In addition to long distance transmission fibers replacing more traditional conducting wire cables, a large variety of other types of optical fiber components are also required in order to make up a complete modern optical telecommunication system. Such components include, for example, optical amplifiers based on rare-earth metal doped active fibers and different types of spectral multiplexing and filtering devices. Spectral filtering in various forms is especially important in systems based on wavelength division multiplexing, WDM.

It is known that an optical fiber, more specifically a single mode fiber can be used as a spectral filter device by coiling the fiber around a reel or corresponding circular body in order to subject the fiber lengthwise to a certain continuous curvature. The radius of this curvature determines the cut-off wavelength of such a coiled fiber filter. With smaller radius of the curvature the cut-off wavelength moves towards shorter wavelengths. When the wavelength of the light transmitted through the fiber core exceeds the aforementioned cut-off wavelength, the optical power starts to leak from the fiber core to the cladding layer surrounding the core. In the cladding layer the light experiences significantly higher attenuation than in the fiber core. The overall attenuation characteristics of a the fiber filter can be controlled by the number of fiber turns coiled around the reel.

In practise, the operation of a coiled fiber filter deviates from ideal because above the cut-off wavelength all of the wavelengths do not become attenuated equally and homogeneously. Because only a finite number of guided modes exits in the cladding layer, some wavelengths become coupled to cladding modes more effectively than others. The limited number of cladding modes gives rise to a certain amount of unwanted coupling of the light from the cladding layer back to the fiber core, i.e. reversed coupling effects. As a result of these aforementioned effects, the typical transmission of a prior art coiled fiber filter shown in FIG. 1 as graph P is not a smooth downward curve after the cut-off wavelength $\lambda_{off}$, but instead shows significant "interference" peaks at certain wavelengths. For comparison, FIG. 1 also shows a more desirable smooth transmission graph I of a more ideal low-pass filter.

From the prior art certain solutions are known in order to reduce the aforementioned effects. These solutions are primarily based on the idea of increasing the attenuation of the cladding layer and/or by arranging the cladding layer to be surrounded with a specific envelope layer, which allows the light to leak from the cladding layer further to this outside envelope or jacket layer. However, these prior art solutions have certain significant limitations. Because they are basically based on increasing the attenuation of the cladding layer, they are not suitable for those applications where also the cladding layer itself is utilized as an optical waveguide. Such applications include, for example, cladding pumped optical fiber amplifiers, where the pump light propagating in the cladding layer should not become attenuated due to the intrinsic optical properties of the cladding layer.

SUMMARY OF THE INVENTION

The objective of the present invention is to introduce a new approach that makes it possible to construct optical fiber based spectral filtering devices, whose spectral properties are superior to the prior art devices. Especially, the intention is to achieve filter devices where after the cut-off wavelength the transmission drops down more smoothly than in the prior art devices. Further, one specific objective of the invention is to construct devices, which are also suitable to be used in the kind of applications, where, in addition to the fiber core, also the cladding layer of the fiber has a role of acting as an optical waveguide. An important example of such application can be found among cladding pumped fiber amplifiers.

In this invention it has been rather surprisingly discovered that the performance of a coiled optical fiber filter can be significantly improved when the fiber is twisted over its length in whole or in part around its longitudinal axis in addition to subjecting it to a certain longitudinal curvature.

In order for the longitudinal twisting of the fiber to have the desired effect, the optical fiber needs to be of a type without radial symmetry, i.e. radially asymmetrical fiber. Such radially asymmetrical optical fibers are known as such from the prior art. Radial asymmetry can be achieved, for example, by using an off-centered core, or by providing a cladding layer where the refraction index varies in a radially asymmetrical manner. Radial asymmetry may also be achieved by using optical fiber structures, where the cross-section of the fiber core (or even cladding) is non-circular. Such fibers are known from polarization sensitive applications. Fundamentally, in this context the radial asymmetry refers broadly to any optical fiber structures where the radial distribution of the refractive index is asymmetrical.

In an optical fiber filter, where the fiber is both coiled and twisted according to the invention, the leak of light from the fiber core to the cladding layer takes place more ideally than in the prior art filters, i.e. without significant amount of reversed coupling effects. Above the cut-off wavelength all wavelengths thus "see" temporally substantially equal amount of matching with the cladding modes. In other words, when a certain length of the twisted and coiled optical fiber is considered, with high probability, there always exist such cladding modes which allow the light to become coupled from the core to the cladding.

As a result of this the transmission curve of the device has a smoothly descending behaviour after the cut-off wavelength.

The current invention is especially suitable to be used as a distributed spectral filter in cladding pumped fiber amplifiers, because the fiber structure allows the propagation of the pump light in the cladding layer.

For a person skilled in the art, it is clear that compared to the prior art solutions, the invention significantly widens the possibilities to optimize the fiber filter structures. Without "interference" peaks the cut-off wavelength and the attenuation properties of the fiber filter can be more freely adjusted than in the prior art devices.

BRIEF DESCRIPTION OF THE DRAWINGS

In the following, the invention will be described in more detail with reference to the appended drawings, in which.

DETAILED DESCRIPTION OF THE INVENTION

The following conceptual explanation is meant to describe, in a simplified way, some of the most important physical phenomena behind the invention. It should be noted that this description is not intended to be scientifically exhaustive, but it is only meant to help recognise the most essential features of the invention.

Figure 2:
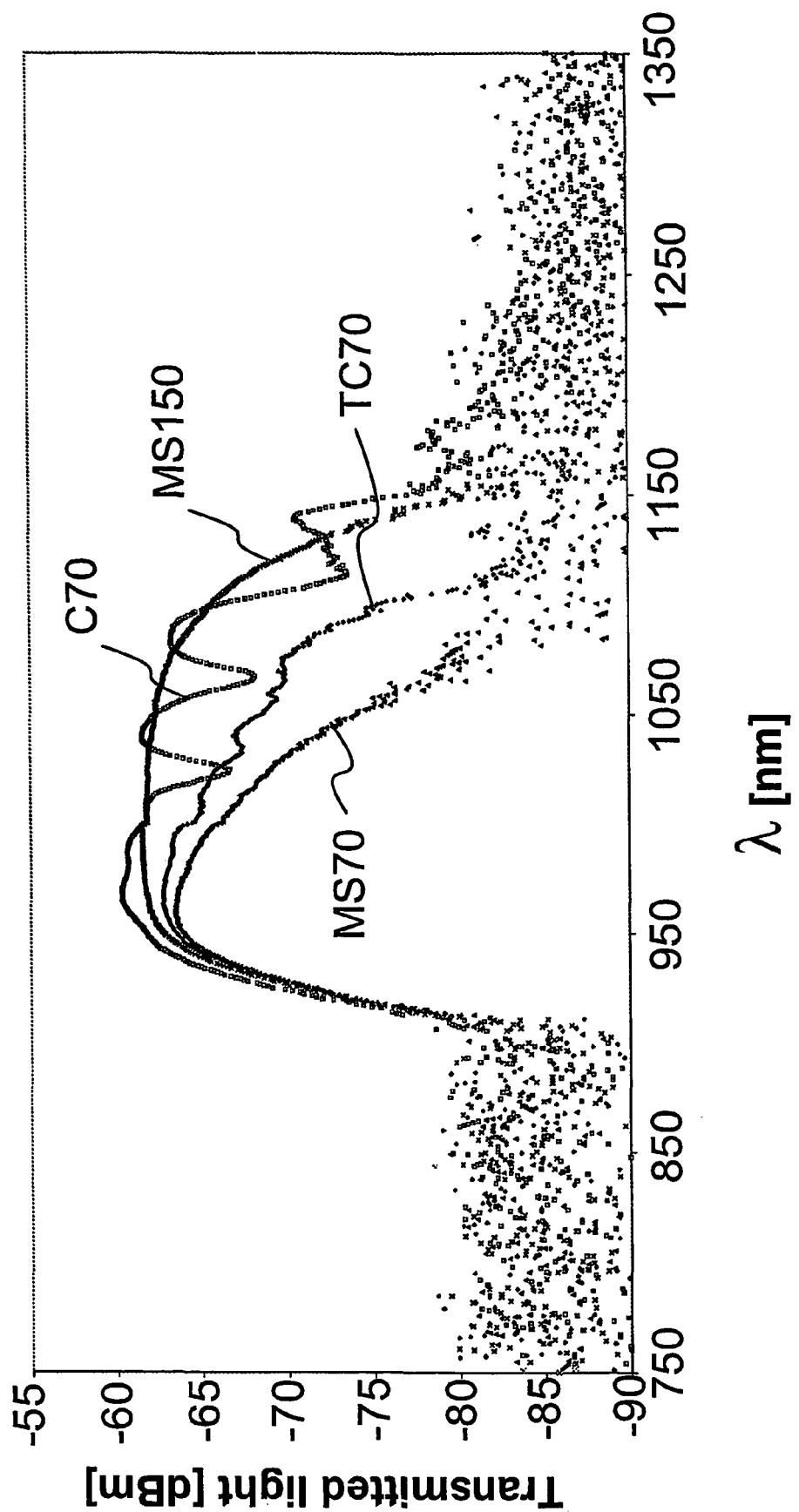
FIG. 2 shows some experimental and comparison results illustrating the basic transmission properties of an optical fiber filter according to the invention, FIGS. 3a,b describe conceptually the propagation of light in a substantially straight and radially symmetric fiber, FIGS. 4a,b describe conceptually the propagation of light in a longitudinally curved and radially symmetric fiber, and FIGS. 5a,b,c describe conceptually the propagation of light in a longitudinally curved and radially asymmetric fiber, which has been twisted around its longitudinal axis according to the invention.

To begin, a few measurement results are presented in FIG. 2 in order to illustrate the effect that can be achieved when the optical fiber in a coiled fiber filter is additionally twisted around its longitudinal axis according to the invention. It should be understood, that the results in FIG. 2 and the construction of the corresponding fiber filter devices are provided only to illustrate the effect itself and therefore do not necessarily correspond with the results or construction of any practical fiber filter device.

Figures 5A, 5B, 5C:
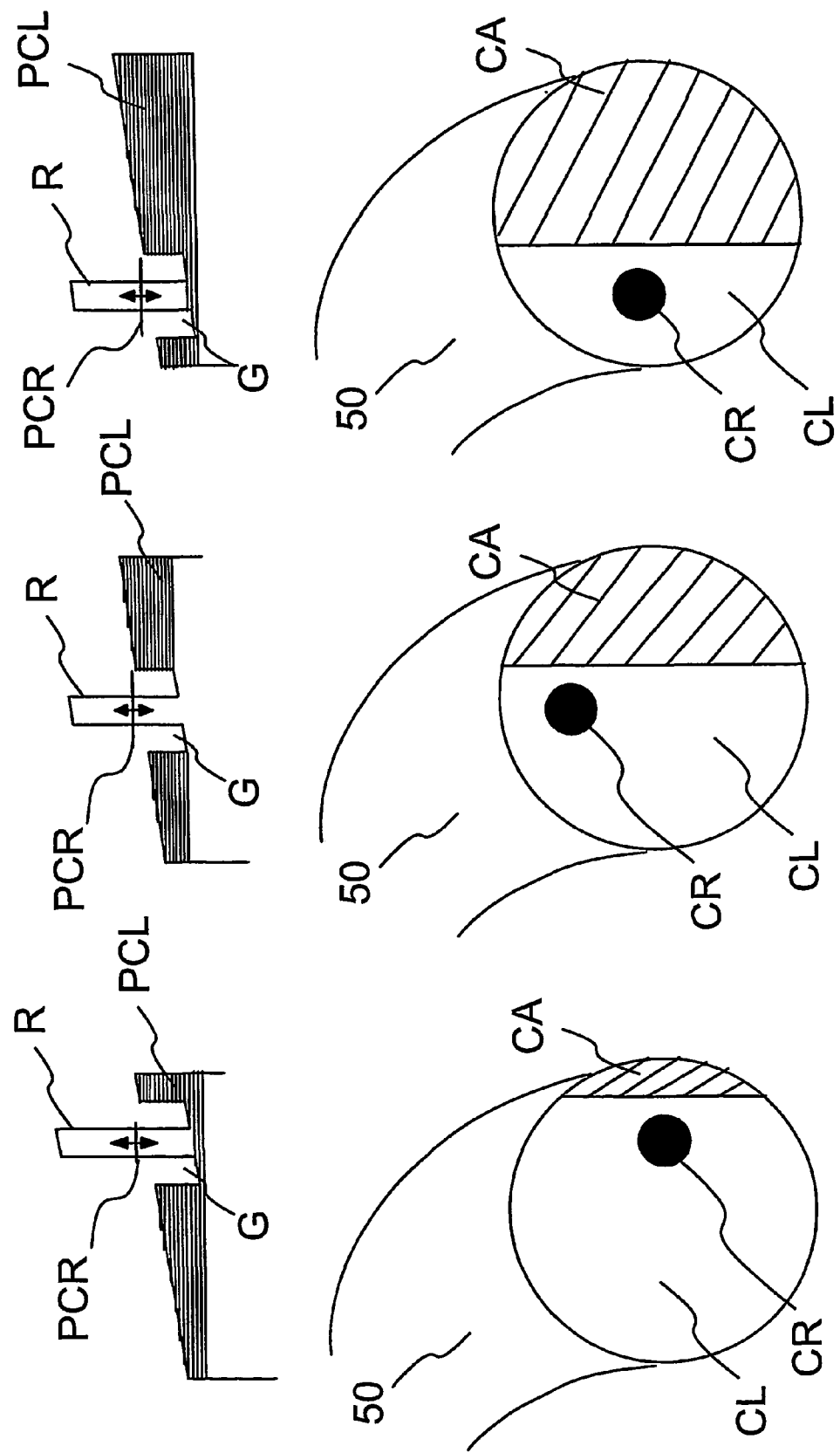

The measurement results shown in FIG. 2 have been recorded using an approximately 2 meter long single-mode fiber having an off-centered core, i.e. a radially asymmetric construction. The fiber core diameter was 6 μm and the total diameter of the fiber including the cladding layer was 125 μm. The core was located approximately 30 μm from the center. The refractive index distribution of the fiber was of the same "W-type" as schematically shown in FIGS. 5a–5c, i.e. with a depressed refractive index cladding region G next to the fiber core.

In FIG. 2 graph C70 first shows the transmission for the aforementioned off-centered fiber, which has been coiled without twisting one lap around a reel with an approximately 70 mm diameter. Therefore, graph C70 may be regarded to correspond to the performance of a prior art type fiber filter, such as shown schematically in FIG. 1 with graph P. Graph TC70 shows the transmission of the same fiber in an otherwise similar situation, except that in this case the fiber was twisted around its longitudinal axis according to the invention. After coiling the fiber was twisted so that the fiber experienced an approximately 720° twist around its longitudinal axis substantially evenly along its coiled length. In other words, the fiber was first coiled one turn around the 70 mm reel. Then the fiber was fixed from the starting point of the turn to the reel and the fiber was twisted approximately two full turns from the point close to the ending point of the lap. It can be clearly seen, that graph TC70 corresponds to much more desirable transmission properties than graph C70.

For comparison, FIG. 2 also contains additional graphs MS70 and MS150. These graphs correspond to coiled, but non-twisted fibers with reel diameters of approximately 70 and 150 mm, correspondingly. The coating of these fibers was stripped off and immersion oil was further used for mode stripping, i.e. for elimination of the cladding modes.

In the following, with reference to FIGS. 3a–5c, the basic physical phenomena behind the invention are further explained together with some possible embodiments of the invention.

Figure 3B:
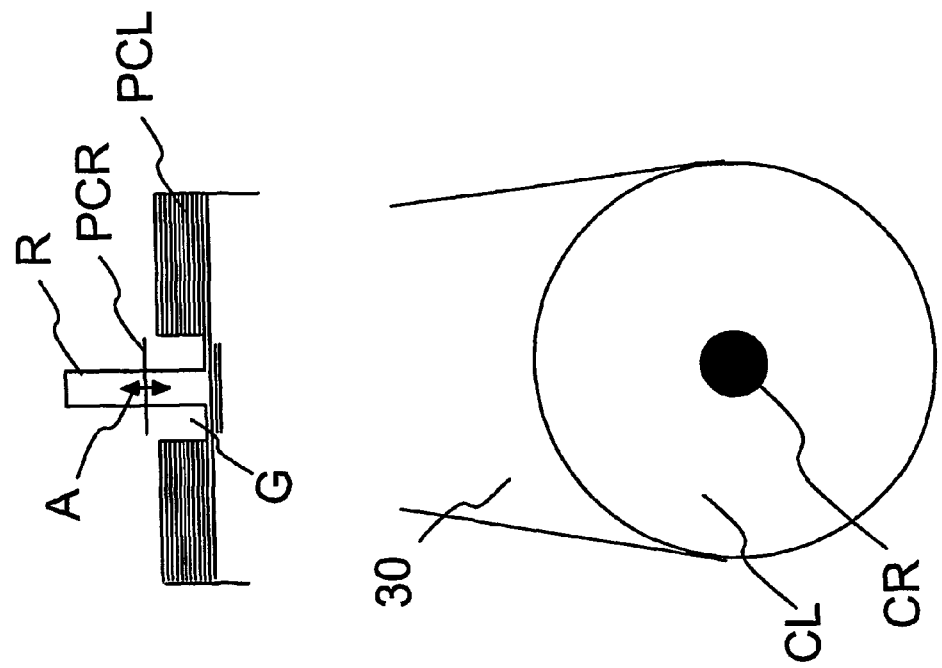
Figure 3A:
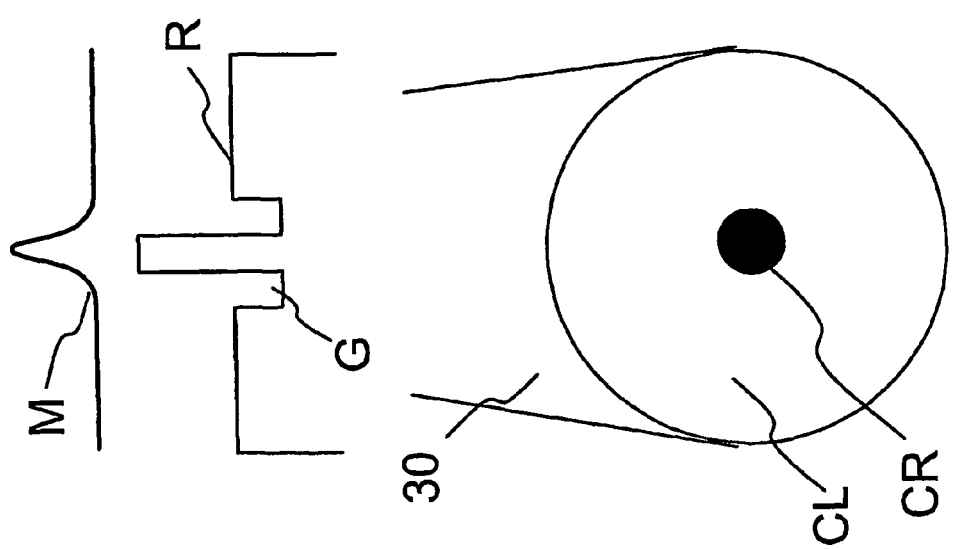

FIGS. 3a,3b describe conceptually the propagation of light in a substantially straight and radially symmetric fiber 30 comprising a core region CR and a cladding region CL. FIG. 3a shows in its upper section the refractive index profile R and the corresponding mode field M of the fiber 30. In this case the refractive index profile R includes a narrow depressed refractive index cladding region G in the cladding next to the fiber core. In this depressed refractive index cladding region G the refractive index is arranged to be somewhat lower than in the other outer parts of the cladding region CL. Such "W-type" refractive index profiles R having a certain depressed region G in the refractive index around the fiber core are known as such from the prior art. Respectively, FIG. 3b shows conceptually in its upper section the core mode propagation constant PCR and the cladding mode propagation constants PCL depicted with horizontal solid lines.

When the wavelength of the light changes, this affects the core mode propagation constant PCR in a known manner. This effect is depicted in FIG. 3b with arrow A. The core mode propagation constant PCR depends substantially linearly on the wavelength. When the core mode propagation constant PCR decreases the amount of mode field M in the cladding region CL increases exponentially. When the wavelength of light increases, the core mode propagation constant PCR becomes smaller and when the core mode propagation constant PCR and that of the cladding modes PCL coincide, there exists strong coupling from the core mode to the cladding modes. The amount of the mode field in the cladding region CL gives the coupling coefficient between the core mode and the cladding modes. If and when the propagation constants are the same for the core mode and a cladding mode, the power starts to go back and forth between these two modes.

Figure 4B:
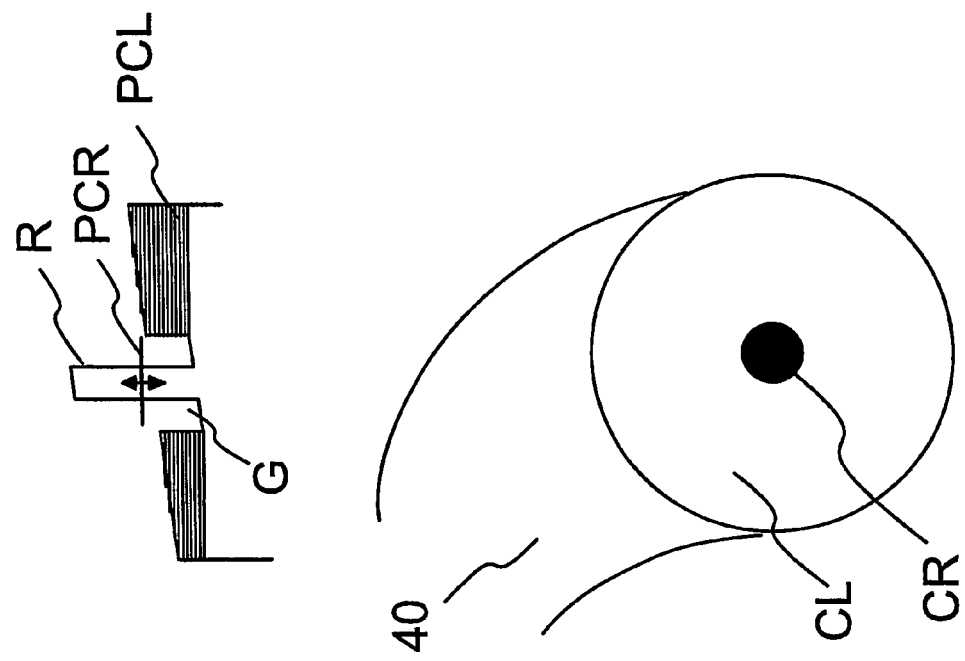
Figure 4A:
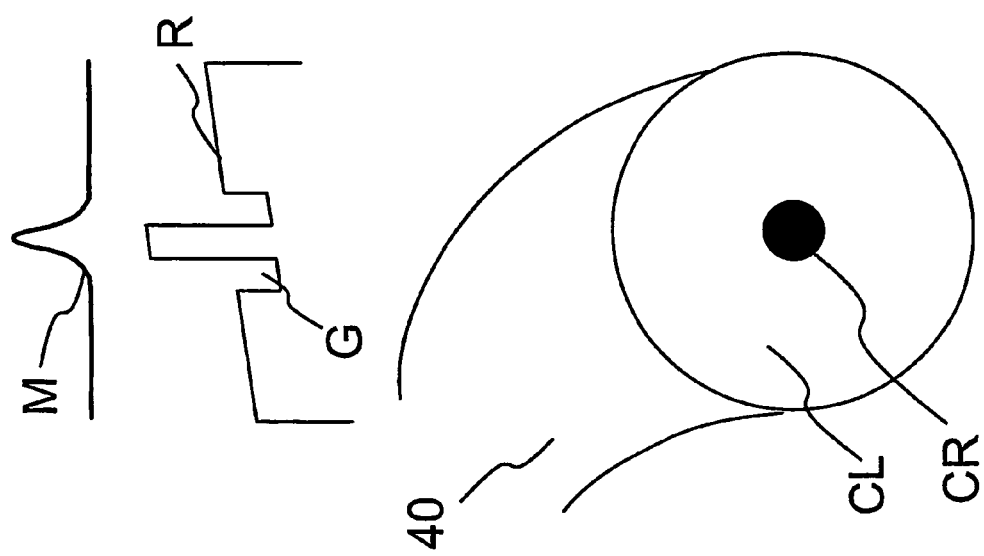

FIGS. 4a,4b describe in a similar conceptual manner the propagation of light in a longitudinally curved and radially symmetric fiber 40. Therefore, FIGS. 4a,4b describe the basic phenomena covering the operation of a prior art coiled fiber filter.

From FIGS. 4a,4b it can be seen that the curvature of the fiber 40 (to the left in FIGS. 4a,4b and also in FIGS. 5a–5c) causes an increase in the refractive index in the outer bend of the fiber 40. Therefore, the refractive index profile R becomes tilted as schematically shown in the upper sections of FIGS. 4a,4b. Correspondingly, the propagation constants of the modes in the cladding region CL in the outer bend become elevated. This lowers the cut-off wavelength for a coiled and curved fiber.

Figure 1:
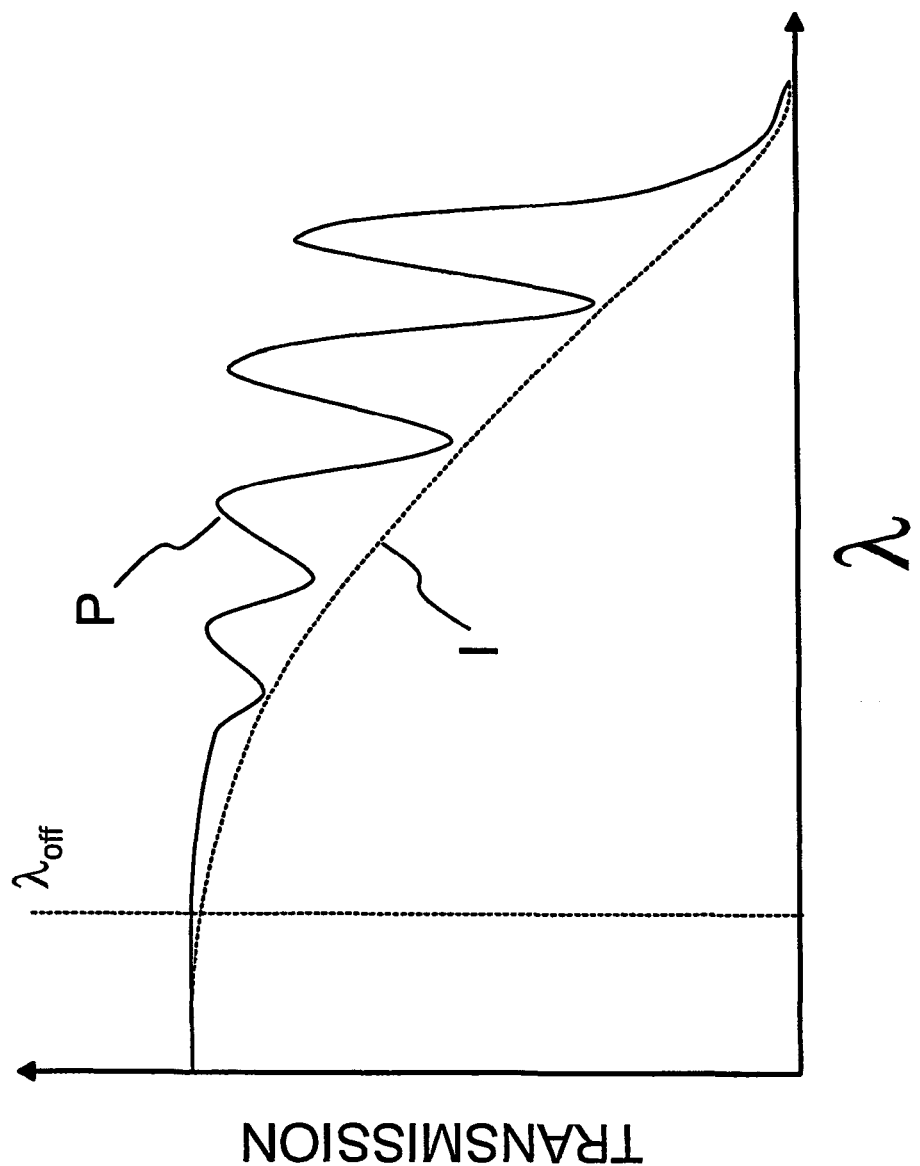
FIG. 1 shows schematically a typical transmission behaviour of a prior art coiled fiber filter together with a more ideal smooth transmission curve.

The "interference" peaks shown in FIGS. 1 and 2 (graphs P and C70, respectively) arise due to the fact that there exists only a finite number of propagating modes in the cladding layer CL. Therefore, for certain wavelengths above the cut-off wavelength the conditions become such, that the light power is able to couple to the cladding layer CL (and back) only at certain occasions when moving along the length of the fiber 40. In other words, when a certain length of the fiber 40 is considered, the different wavelengths become treated unequally in what comes to the coupling between core CR and cladding CL and to the consequential loss of the light from core CR.

FIGS. 5a–5c now describe conceptually the propagation of light in a longitudinally curved and radially asymmetric fiber 50, which has been further twisted around its longitudinal axis according to the invention. FIGS. 5a–5c describe three different situations with a relative twist of approximately 90° between FIGS. 5a and 5b, and again the same between FIGS. 5b and 5c.

Because of the twist of the fiber 50, in different locations along the fiber length, the core mode propagation constant PCR can be found to have moved compared to the cladding modes PCL. The reason for this is that when moving along the length of the twisted and coiled fiber 50, the core CR moves into different positions compared to the outer curved surface (cladding surface) of the fiber (see lower sections of FIGS. 5a–5c). This "averages" the coupling between the core mode to a certain set of the cladding modes. Now, above the cut-off wavelength substantially all wavelengths, i.e. substantially all core mode propagation constants PCR, "see" temporally an equal amount of matching with the cladding modes PCL. In other words, when a certain length of the fiber 50 is considered, such cladding modes which allow the light to become coupled from the core to the cladding always exist. As a result of this, above the cut-off wavelength the transmission of the fiber 50 has a smooth descending behaviour without disturbing interference peaks.

In the lower sections of FIGS. 5a–5c the hatched area CA depicts the cross-sectional area in which the cladding mode propagation constants PCL are equal or higher than the core mode propagation constant PCR. In those situations the core and cladding modes have possibility to match and energy can move from the core to the cladding layer.

In order for the longitudinal twisting of the fiber 50 to have the desired effect, the fiber 50 needs to have a certain degree of radial asymmetry. In the embodiment described in FIGS. 5a–5c the radial asymmetry is achieved by using an optical fiber 50 with an off-centered core CR. However, the current invention is not limited to such embodiments, but also other means for providing radial asymmetry of the refractive index distribution may be applied. For example, radial asymmetry in a fiber can be achieved by providing a cladding layer CL where the refraction index varies in a radially asymmetrical manner. Radial asymmetry may also be achieved by using such fiber structures, where the cross-section of the fiber core CR and/or the fiber cladding CL is non-circular. Such fibers are known, for example, from certain polarization sensitive applications where the fiber core is non-circular or cladding pumped fibers where the fiber cladding is non-circular.

It should be noted, that even if the fiber 50 shown in FIGS. 5a–5c includes the depressed refractive index cladding region G in the cladding layer next to the fiber core, this is not an absolute necessity for a fiber filter according to the invention. Such a structure, however, is preferable in many applications because it makes the filtering effect sharper.

The current invention is especially suitable to be used as a distributed spectral filter in cladding pumped fiber amplifiers, because the fiber structure now allows the propagation of the pump light in the cladding layer. For a person skilled in the art, it is clear that compared to the prior art solutions the invention significantly widens the possibilities to optimize the fiber filter structures. Without "interference" peaks the cut-off wavelength and the attenuation properties of the fiber filter can be freely engineered and fine-tuned according to the respective needs.

The invention also makes it possible to use very large fiber core designs (>10 um), which can handle higher laser powers without problems created by non-linear optical phenomena.

An important benefit of the invention is that the fiber filter devices according to the invention are simple to manufacture also in practise. In addition to coiling an optical fiber, the fiber only needs to be twisted around its longitudinal axis either before, during or after the coiling process. The strength of the effect can be adjusted by selecting the amount of twisting (degrees or turns) per a certain length of the fiber. The twisting may be arranged to appear evenly along the total length of the fiber, or to be concentrated only to certain parts of the fiber. In a fiber filter having several laps coiled around a reel, the twisting may be arranged to distribute over all of the coiled laps or only to some or one of the coiled laps. Depending on the amount of radial asymmetry of the fiber, the amount of twisting may be freely adjusted to accomplish desired transmission properties. These and other parameters, including the length and the optical properties of the fiber, may be freely selected.

Even though the invention has been shown and described above with respect to selected types of embodiments, it should be understood that these embodiments are only examples and that a person skilled in the art could construct other fiber filter devices utilizing techniques other than those specifically disclosed herein while still remaining within the spirit and scope of the present invention. It should, therefore, be understood that various omissions and substitutions and changes in the form and detail of the filter devices illustrated, as well as in the operation of the same, may be made by those skilled in the art without departing from the spirit of the invention. It is the intention, therefore, to restrict the invention only in the manner indicated by the scope of the claims appended hereto.

The invention claimed is:

1. A method in optical fiber based spectral filtering, where a length of an optical fiber comprising at least a core region surrounded by a cladding region is coiled over its length in whole or in part to subject the fiber to longitudinal curvature in order to affect the optical transmission properties of the fiber, wherein the fiber is arranged to have radially asymmetric refractive index distribution and in addition to coiling the fiber lengthwise, the fiber is over its length in whole or in part also twisted around its longitudinal axis.

2. The method according to claim 1, wherein the optical fiber is arranged to have a radially off-centered core region.

3. The method according to claim 1, wherein the optical fiber is arranged to have a non-circular core or cladding region.

4. The method according to claim 1, wherein the optical fiber is arranged to have a region of depressed refractive index in the cladding region located in the vicinity of the core region.

5. The method according to claim 1, wherein the optical fiber is a single mode fiber.

6. An optical fiber device for spectral filtering containing a length of optical fiber, the fiber comprising at least a core region surrounded by a cladding region, and the fiber being coiled over its length in whole or in part to subject the fiber to longitudinal curvature in order to affect the optical transmission properties of the fiber, wherein the fiber is arranged to have radially asymmetric refractive index distribution and in addition to being coiled lengthwise, the fiber is over its length in whole or in part also arranged to be twisted around its longitudinal axis.

7. The device according to claim 6, wherein the optical fiber has a radially off-centered core region.

8. The device according to claim 6, wherein the optical fiber has a non-circular core or cladding region.

9. The device according to claim 6, wherein the optical fiber has a region of depressed refractive index in the cladding region located in the vicinity of the core region.

10. The device according to claim 6, wherein the optical fiber is a single mode fiber.

11. The device according to claim 6, wherein the optical fiber is a rare-earth metal doped active fiber.

12. The device according to claim 11, wherein the optical fiber constitutes a distributed fiber filter in an optical fiber amplifier.

13. The device according to claim 12, wherein the optical fiber constitutes a part of a cladding pumped optical fiber amplifier.

* * * * *